(12) United States Patent
Toth et al.

(10) Patent No.: US 9,945,481 B2
(45) Date of Patent: Apr. 17, 2018

(54) POLYMER COATING IN CRACKED PISTON RING COATING

(71) Applicant: Federal-Mogul Corporation, Southfield, MI (US)

(72) Inventors: James R. Toth, Ann Arbor, MI (US); Matt Pedigo, Howell, MI (US); Troy Kantola, Whitmore, MI (US)

(73) Assignee: Federal-Mogul LLC, Southfield, MI (US)

( * ) Notice: Subject to any disclaimer, the term of this patent is extended or adjusted under 35 U.S.C. 154(b) by 0 days.

(21) Appl. No.: 15/204,264

(22) Filed: Jul. 7, 2016

(65) Prior Publication Data

US 2018/0010689 A1 Jan. 11, 2018

(51) Int. Cl.
*F16J 9/26* (2006.01)
*F16J 9/12* (2006.01)

(52) U.S. Cl.
CPC .. *F16J 9/26* (2013.01); *F16J 9/12* (2013.01)

(58) Field of Classification Search
CPC .. F16J 9/00; F16J 9/12; F16J 9/26; F16J 9/28
See application file for complete search history.

(56) References Cited

U.S. PATENT DOCUMENTS

| | | | |
|---|---|---|---|
| 4,846,940 A | 7/1989 | Neuhauser et al. | |
| 5,480,536 A | 1/1996 | Suehiro et al. | |
| 6,503,642 B1 | 1/2003 | Linde | |
| 8,337,687 B2 | 12/2012 | Linde et al. | |
| 2011/0268944 A1 | 11/2011 | Adam et al. | |
| 2016/0312891 A1* | 10/2016 | Kantola | C25D 9/04 |
| 2017/0130841 A1* | 5/2017 | Kantola | F16J 9/26 |

* cited by examiner

*Primary Examiner* — Gilbert Y Lee
(74) *Attorney, Agent, or Firm* — Robert L. Stearns; Dickinson Wright, PLLC

(57) ABSTRACT

A piston ring including a base coating, for example a chromium-based material with an intentionally etched crack network is provided. The cracks of the base coating are filled with a sliding material, which is expected to improve scuff resistance. The sliding material includes polyamideimide (PAI) and $Fe_2O_3$. The sliding material can also include solid lubricant and hard materials. Alternatively, the base coating is formed of diamond-like carbon and applied to the piston ring by physical vapor deposition (PVD). In this case, the base coating includes protuberances or bumps, and the sliding material is disposed between protuberances of the base coating.

19 Claims, 2 Drawing Sheets

POLYMER COATING IN CRACKED PISTON RING COATING

BACKGROUND OF THE INVENTION

1. Field of the Invention

The invention relates generally to piston rings for internal combustion engines, and more particularly to coated piston rings, and methods of forming the coated piston rings.

2. Related Art

A piston of a reciprocating engine, such as an internal combustion engine, typically includes rings disposed in grooves along the outer diameter of the piston. The piston rings facilitate guiding of the piston during reciprocation in a cylinder bore. The piston rings also seal combustion gases and inhibit the upward passage of oil. The piston rings are subject to wear as they move along the cylinder bore due to gas load and their own inherent load. Accordingly, the piston rings are typically coated or treated to enhance wear resistance. For example, the piston rings may be nitrided, coated with chromium, or coated with a ceramic, which may be applied by physical vapor deposition (PVD) or chemical vapor deposition (CVD).

SUMMARY OF THE INVENTION

One aspect of the invention provides a coated piston ring for reciprocating engine applications, such as internal combustion engines. The piston ring comprises a ring body surrounding a center axis, and the ring body presents an outer diameter surface facing opposite the center axis. A base coating, for example a chromium-based material or diamond like carbon (DLC), is applied to the outer diameter surface of the ring body. The base coating includes a plurality of cracks, and a sliding material is disposed in the cracks of the base coating. The sliding material includes polyamideimide (PAI) and $Fe_2O_3$. According to an alternate embodiment, the base coating includes a plurality of protuberances, and the sliding material is disposed between the protuberances.

Another aspect of the invention provides a method of manufacturing a coated piston ring. The method includes applying a base coating to an outer diameter surface of piston a ring body, and disposing a sliding material in cracks of the base coating, or between protuberances of the base coating, wherein the sliding material includes polyamideimide and $Fe_2O_3$.

The coated piston ring is able to provide wear resistance, due to the base coating, and lubricating properties, due to the sliding material disposed in the cracks or between the protuberances of the base coating. The coated piston ring is expected to achieve improved sliding properties and scuff resistance.

BRIEF DESCRIPTION OF THE DRAWINGS

Other advantages of the present invention will be readily appreciated, as the same becomes better understood by reference to the following detailed description when considered in connection with the accompanying drawings, wherein.

DETAILED DESCRIPTION

Figure 2:
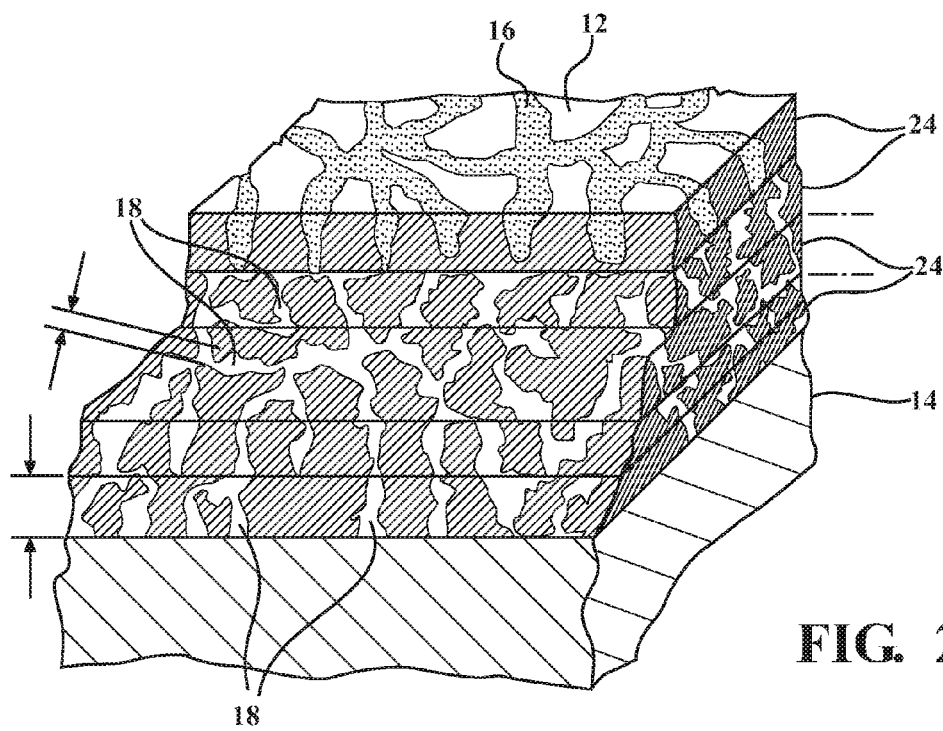
FIG. 2 is an enlarged cross-sectional view of a portion of the coated piston ring of FIG. 1.
Figure 3:
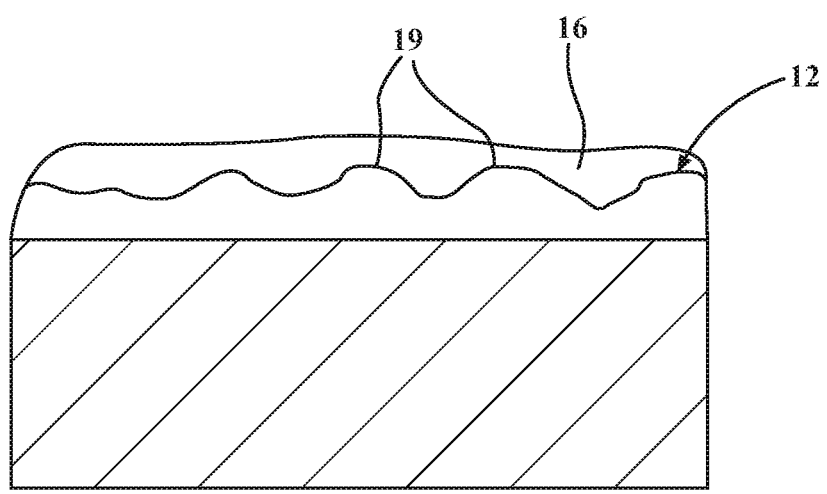
FIG. 3 is an enlarged cross-sectional view of a portion of a coating piston ring according to another embodiment.

One aspect of the invention provides a coated piston ring 10 for reciprocating engine applications, such as internal combustion engines. The piston ring 10 includes a base coating 12 for wear resistance, such as a chromium-based material or diamond like carbon (DLC), applied to a ring body 14. According to one embodiment, shown in FIGS. 1 and 2, the sliding material 16 is disposed in cracks 18 of the base coating 12 to provide lubrication and thus enhance sliding properties and scuff resistance. According to another embodiment, as shown in FIG. 3, the sliding material 16 is disposed between bumps or protuberances 19 along an exposed surface of the base coating 12. In this case, the base coating 12 has a varied topography. The protuberances 19, rather than the cracks 18, are typically present when the base coating 12 includes diamond-like carbon (DLC).

Figure 1:
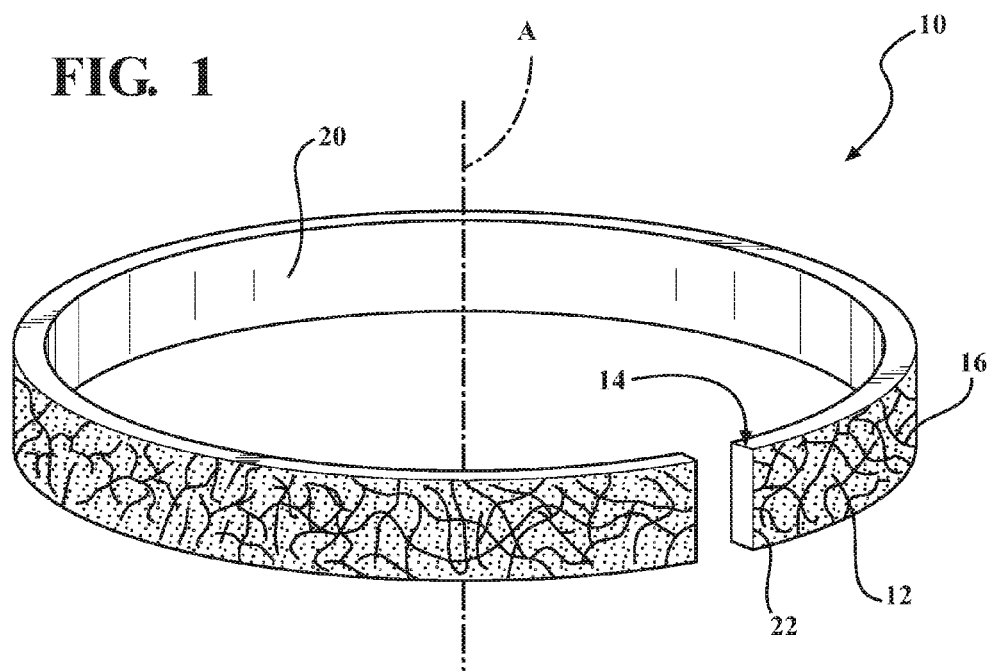
FIG. 1 is a perspective view of a coated piston ring according to an embodiment of the invention.

An example of the coated piston ring 10 is generally shown in FIG. 1. The ring body 14 extends circumferentially around a center axis A and presents an inner diameter surface 20 facing the center axis A. An outer diameter surface 22 faces opposite the center axis A. The ring body 14 is formed of a metal material, such as cast iron, steel, or cast steel.

The base coating 12 is applied to the outer diameter surface 22 of the ring body 14, and can also be applied to other surfaces of the ring body 14. According to one embodiment, the base coating 12 is a chromium-based material, which typically includes chromium in an amount of at least 70.0 weight percent (wt. %), based on the total weight of the base coating. Alternatively, the base coating 12 could be a diamond-like carbon (DLC) material. As shown in FIG. 2, the base coating 12 typically comprises a plurality of layers 24. In the embodiment wherein the base coating 12 is the chromium-based material, each of the layers 24 has a thickness of 8 to 12 µm.

In the example embodiment of FIGS. 1 and 2, the cracks 18 of the base coating 12 are intentionally formed to provide an opened crack network. Typically, the cracks 18 are formed by physical or chemical etching, but may be formed by other methods. In the example embodiment, wherein the base coating 12 is the chromium-based material, each of the cracks 18 has a width of 1 to 6 µm and a depth of up to 12 µm. The cracks 18 of the example embodiment are also formed to achieve a desired crack network, typically between 40 and 150 cracks/mm. The spaces between the protuberances 19 of the base coating 12 of FIG. 3 can have the same dimensions as the cracks 18.

Also shown in FIG. 1, the sliding material 16 is disposed in the cracks 18 of the base coating 12, and typically in an uppermost one of the layers 24 of the base coating 12, or only in the uppermost one of the layers 24. However, the sliding material 16 could be disposed in the other layers 24 of the base coating 12. Examples of the sliding material 16 are disclosed in US Patent Application No. 2011/0268944, which is incorporated herein by reference. According to a preferred embodiment, the sliding material 16 is a polymer coating marketed under the name IROX®.

The sliding material 16 includes a combination of polyamideimide (PAI) and $Fe_2O_3$. The PAI is present in an amount of at least 40.0 volume percent (vol. %), or 50.0 vol. %, 60.0 vol. %, based on the total volume of the sliding material 16. The $Fe_2O_3$ is present in an amount of 0.1 vol. % to 15.0 vol. %, or 0.5 vol. % to 8.0 vol. %, based on the total volume of the sliding material 16. The $Fe_2O_3$ is typically provided in the form of particles having an average particle size of 0.01 to 5.0 μm.

In the example embodiment, the sliding material 16 includes additional components to enhance lubrication, sliding properties, scuff resistance, or other performance characteristics. The example sliding material 16 includes solid lubricant in an amount of up to about 30.0 vol. %, or up to 9.5 vol. %, based on the total volume of the sliding material 16. A preferred range is 5 vol. % to 30 vol. %, based on the total volume of the sliding material 16. In the example embodiment, the solid lubricant includes at least one of a metal sulphide, graphite, hexagonal boron nitride (hBN), and PTFE.

The sliding material 16 of the example embodiment also includes hard material in an amount of up to 5 vol. %, or 3 vol. % to 5 vol. %, based on the total volume of the sliding material 16. The hard material includes at least one of nitrides, carbides, borides, oxides, and metal powders. For example, the hard materials can include one or more components selected from the group consisting of SiC, $Si_3N_4$, $B_4C_3$, cubic BN, $TiO_2$, $SiO_2$, Ag, Pb, Au, SnBi, and Cu.

Another aspect of the invention provides a method of manufacturing the coated piston ring 10. The method includes the steps of applying the base coating 12 to the outer diameter surface 22 of the metal ring body 14, and disposing a sliding material 16 in the cracks 18 or between the protuberances 19 of the base coating 12.

If the base coating 12 is the chromium-based material, then the step of applying the base coating 12 to the outer diameter surface 22 typically includes electroplating. If the base material 12 includes diamond-like carbon (DLC), then the step of applying the base coating 12 typically includes physical vapor deposition (PVD) or chemical vapor deposition (CVD). In this case, the base coating 12 typically includes the protuberances 19 upon application. Other methods can alternatively be used to apply the base coating 12. The method can include applying a single layer 24 of the base coating 12, or multiple layers 24 of the base coating 12.

In one embodiment, the method further includes forming the cracks 18 in the base coating 12. The cracks 18 can be intentionally formed after applying the base coating 12 to the ring body 14 to achieve the opened cracked network. Electrolytic or chemical etching can be used to form the cracks 18. The cracks 18 can be formed in a single layer 24 of the base coating 12, or each of the layers 24, as shown in FIG. 2. In the alternate embodiment, the protuberances 19 are present in the base coating 12, and thus the etching is not required.

The method further includes applying the sliding material 16 to the base coating 12. According to one example embodiment, the sliding material 16 is applied as a liquid or powder material and then formed into a continuous thin film by a chemical or physical process, such as evaporation of a solvent or hardening by UV radiation. However, other methods can be used to dispose the sliding material 16 in the cracks 18 or between the protuberances 19 of the base coating 12. The sliding material 16 typically fills the entire crack volume, or at least a majority of the crack volume. If the base coating 12 includes the protuberances 19, then the sliding material 16 typically fills the entire volume of the spaces between the protuberances 19, or at least a majority of the volume. The sliding material 16 could also form a layer over the base coating 12.

Obviously, many modifications and variations of the present invention are possible in light of the above teachings and may be practiced otherwise than as specifically described while within the scope of the following claims.

The invention claimed is:

1. A piston ring, comprising:
a ring body surrounding a center axis,
said ring body presenting an outer diameter surface facing opposite said center axis,
a base coating applied to said outer diameter surface of said ring body,
said base coating including a plurality of cracks, and
a sliding material disposed in said cracks of said base coating, said sliding material including polyamideimide (PAI), solid lubricant, hard material, and $Fe_2O_3$, and
wherein said polyamideimide (PAI) is present in an amount of 50.0 vol. %, 60.0 vol. %, based on the total volume of said sliding material; said $Fe_2O_3$ is present in an amount of 0.5 to 8.0 vol. %, based on the total volume of said sliding material; said $Fe_2O_3$ is in the form of particles having an average particle size of 0.01 to 5.0 μm; said solid lubricant is present in an amount of 5 to 30 vol. %, based on the total volume of said sliding material; said solid lubricant includes at least one of a metal sulphide, graphite, hexagonal boron nitride (hBN), and PTFE; said hard material is present in an amount of 3 to 5 vol. %, based on the total volume of said sliding material; and said hard material includes one or more components selected from the group consisting of SiC, $Si_3N_4$, $B_4C_3$, cubic BN, $TiO_2$, $SiO_2$, Ag, Pb, Au, SnBi, and Cu.

2. The piston ring of claim 1, wherein said base coating is a chromium-based material.

3. The piston ring of claim 1, wherein said base coating includes diamond-like carbon (DLC).

4. The piston ring of claim 1, wherein said base coating includes a plurality of layers, each of said layers having a thickness of 8 to 12 μm.

5. The piston ring of claim 1, wherein said base coating includes a plurality of cracks, each of said cracks has a width of 1 to 6 μm and a depth of up to 12 μm.

6. The piston ring of claim 1, wherein said cracks of said base coating are present in an amount between 40 and 150 cracks/mm.

7. A piston ring, comprising:
a ring body surrounding a center axis,
said ring body presenting an outer diameter surface facing opposite said center axis, a base coating applied to said outer diameter surface of said ring body,
said base coating including a plurality of cracks, and
a sliding material disposed in said cracks of said base coating, said sliding material including polyamideimide (PAI) and $Fe_2O_3$
wherein said ring body extends circumferentially around said center axis,
said ring body presents an inner diameter surface facing said center axis,
said ring body is formed of a metal material, said metal material is cast iron, steel, or cast steel,
said base coating is a chromium-based material, the chromium being present in an amount of at least 70.0 wt. %, based on the total weight of said base coating,
said base coating includes a plurality of layers, each of said layers of said base coating has a thickness of 8 to 12 μm,
said base coating includes a plurality of cracks,
each of said cracks has a width of 1 to 6 μm,
each of said cracks has a depth of up to 12 μm,
said cracks in said base coating are present in an amount of between 40 and 150 cracks/mm, said sliding material is disposed in said cracks of an uppermost one of said layers of said base coating, said polyamideimide (PAI) is present in an amount of at least 40.0 volume percent (vol. %), based on the total volume of said sliding material, said $Fe_2O_3$ is present in an amount of 0.1 vol. % to 15.0 vol. %, based on the total volume of said sliding material, said $Fe_2O_3$ is in the form of particles have an average particle size of 0.01 to 5.0 µm, said sliding material includes solid lubricant in an amount of up to about 30.0 vol. %, said solid lubricant includes at least one of a metal sulphide, graphite, hexagonal boron nitride (hBN), and PTFE, said sliding material includes hard material in an amount of up to 5 vol. %, based on the total volume of said sliding material, said hard material includes at least one of nitrides, carbides, borides, oxides, and metal powders.

8. A piston ring, comprising:
a ring body surrounding a center axis,
said ring body presenting an outer diameter surface facing opposite said center axis,
a base coating applied to said outer diameter surface of said ring body,
said base coating including a plurality of protuberances, and
a sliding material disposed between said protuberances of said base coating, said sliding material including polyamideimide (PAI), solid lubricant, hard material, and $Fe_2O_3$,
wherein the polyamideimide (PAI) is present in an amount of 50.0 vol. %, 60.0 vol. %, based on the total volume of the sliding material; the $Fe_2O_3$ is present in an amount of 0.5 to 8.0 vol. %, based on the total volume of the sliding material; the $Fe_2O_3$ is in the form of particles having an average particle size of 0.01 to 5.0 µm; the base material further includes a solid lubricant in an amount of 5 to 30 vol. %, based on the total volume of the sliding material; the solid lubricant includes at least one of a metal sulphide, graphite, hexagonal boron nitride (hBN), and PTFE; the base material includes a hard material present in an amount of 3 to 5 vol. %, based on the total volume of the sliding material; and the hard material includes one or more components selected from the group consisting of SiC, $Si_3N_4$, $B_4C_3$, cubic BN, $TiO_2$, $SiO_2$, Ag, Pb, Au, SnBi, and Cu.

9. The piston ring of claim 8, wherein said base coating includes diamond-like carbon (DLC).

10. A piston ring, comprising:
a ring body surrounding a center axis,
said ring body presenting an outer diameter surface facing opposite said center axis,
a base coating applied to said outer diameter surface of said ring body,
said base coating including a plurality of protuberances, and
a sliding material disposed between said protuberances of said base coating, said sliding material including polyamideimide (PAI) and $Fe_2O_3$,
wherein said ring body extends circumferentially around said center axis,
said ring body presents an inner diameter surface facing said center axis, said ring body is formed of a metal material, said metal material is cast iron, steel, or cast steel, said base coating includes diamond-like carbon (DLC) material, said DLC material being present in an amount of at least 70.0 wt. %, based on the total weight of said base coating, said base coating includes a plurality of spaces between said protuberances which contain said coating, said sliding material is disposed in said spaces between said protuberances of an uppermost one of said layers of said base coating, said polyamideimide (PAI) is present in an amount of at least 40.0 volume percent (vol. %), based on the total volume of said sliding material, said $Fe_2O_3$ is present in an amount of 0.1 vol. % to 15.0 vol. %, based on the total volume of said sliding material, said $Fe_2O_3$ is in the form of particles having an average particle size of 0.01 to 5.0 µm, said sliding material includes solid lubricant in an amount of up to about 30.0 vol. %, said solid lubricant includes at least one of a metal sulphide, graphite, hexagonal boron nitride (hBN), and PTFE, said sliding material includes hard material in an amount of up to 5 vol. %, based on the total volume of said sliding material, and said hard material includes at least one of nitrides, carbides, borides, oxides, and metal powders.

11. A method of manufacturing a coated piston ring, comprising the steps of:
applying a base coating to an outer diameter surface of piston a ring body, and
disposing a sliding material in cracks of said base coating, the sliding material including polyamideimide (PAI), solid lubricant, hard material, and $Fe_2O_3$,
wherein the polyamideimide (PAI) is present in an amount of 50.0 vol. %, 60.0 vol. %, based on the total volume of the sliding material; the $Fe_2O_3$ is present in an amount of 0.5 to 8.0 vol. %, based on the total volume of the sliding material; the $Fe_2O_3$ is in the form of particles having an average particle size of 0.01 to 5.0 µm; the base material further includes a solid lubricant in an amount of 5 to 30 vol. %, based on the total volume of the sliding material; the solid lubricant includes at least one of a metal sulphide, graphite, hexagonal boron nitride (hBN), and PTFE; the base material includes a hard material present in an amount of 3 to 5 vol. %, based on the total volume of the sliding material; and the hard material includes one or more components selected from the group consisting of SiC, $Si_3N_4$, $B_4C_3$, cubic BN, $TiO_2$, $SiO_2$, Ag, Pb, Au, SnBi, and Cu.

12. The method of claim 11, wherein the base coating is a chromium-based material.

13. The method of claim 12, wherein the step of applying the base coating to the outer diameter surface includes electroplating the chromium-based material.

14. The method of claim 11 including forming the cracks in the base material by electrolytic or chemical etching.

15. The method of claim 14, wherein the etching step includes forming the cracks to be present in an amount between 40 and 150 cracks/mm.

16. The method of claim 11, wherein the coating includes diamond-like carbon (DLC).

17. A method of manufacturing a coated piston ring, comprising the steps of:

applying a base coating to an outer diameter surface of piston a ring body, and disposing a sliding material between protuberances of said base coating, the sliding material including polyamideimide (PAD, solid lubricant, hard material, and $Fe_2O_3$ wherein the polyamideimide (PAI) is present in an amount of 50.0 vol. %, 60.0 vol. %, based on the total volume of the sliding material; the $Fe_2O_3$ is present in an amount of 0.5 to 8.0 vol. %, based on the total volume of the sliding material; the $Fe_2O_3$ is in the form of particles having an average particle size of 0.01 to 5.0 μm; the base material further includes a solid lubricant in an amount of 5 to 30 vol. %, based on the total volume of the sliding material; the solid lubricant includes at least one of a metal sulphide, graphite, hexagonal boron nitride (hBN), and PTFE; the base material includes a hard material present in an amount of 3 to 5 vol. %, based on the total volume of the sliding material; and the hard material includes one or more components selected from the group consisting of SiC, $Si_3N_4$, $B_4C_3$, cubic BN, $TiO_2$, $SiO_2$, Ag, Pb, Au, SnBi, and Cu.

18. The method of claim 17, wherein the base coating includes diamond-like carbon.

19. The method of claim 17, wherein the step of applying the base coating to the outer diameter surface includes physical vapor deposition (PVD) or chemical vapor deposition (CVD).

* * * * *